US012698079B2

(12) United States Patent
Augustyn et al.

(10) Patent No.: US 12,698,079 B2
(45) Date of Patent: Aug. 4, 2026

(54) PYLON TRACKING SYSTEMS FOR TILTROTOR AIRCRAFT

(71) Applicant: Textron Innovations Inc., Providence, RI (US)

(72) Inventors: Jacob Eugene Augustyn, Grapevine, TX (US); Evan Butler Bennett, Greenfield, WI (US); Charles Eric Covington, Colleyville, TX (US); Thomas Earl Johnson, Jr., Dallas, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 19/261,581

(22) Filed: Jul. 7, 2025

(65) Prior Publication Data

US 2025/0333162 A1      Oct. 30, 2025

Related U.S. Application Data

(63) Continuation of application No. 17/541,906, filed on Dec. 3, 2021, now Pat. No. 12,377,974.

(60) Provisional application No. 63/138,741, filed on Jan. 18, 2021.

(51) Int. Cl.
| | |
|---|---|
| *B64C 13/38* | (2006.01) |
| *B64C 29/00* | (2006.01) |
| *B64D 27/40* | (2024.01) |
| *B64D 45/00* | (2006.01) |

(52) U.S. Cl.
CPC .......... *B64C 29/0033* (2013.01); *B64C 13/38* (2013.01); *B64C 29/00* (2013.01); *B64D 27/40* (2024.01); *B64D 27/402* (2024.01); *B64D 45/00* (2013.01); *B64D 45/0005* (2013.01)

(58) Field of Classification Search
CPC ..... B64C 29/0033; B64C 13/38; B64C 29/00; B64D 27/40; B64D 27/402; B64D 45/00; B64D 45/0005
See application file for complete search history.

(56) References Cited

U.S. PATENT DOCUMENTS

| | | | |
|---|---|---|---|
| 6,247,667 | B1 | 6/2001 | Fenny et al. |
| 7,913,947 | B2 | 3/2011 | Haynes et al. |
| 8,271,149 | B2 | 9/2012 | Builta |

(Continued)

*Primary Examiner* — Kimberly S Berona
*Assistant Examiner* — Steven J Shur
(74) *Attorney, Agent, or Firm* — Lawrence Youst PLLC

(57) ABSTRACT

A pylon tracking system for a tiltrotor aircraft includes first and second pylons each having a mechanically redundant pylon conversion actuator with first and second drive systems. A position sensor system includes a first rotary position sensor coupled to the first drive system of the first pylon, a second rotary position sensor coupled to the second drive system of the first pylon, a third rotary position sensor coupled to the first drive system of the second pylon and a fourth rotary position sensor coupled to the second drive system of the second pylon. A flight control computer is configured for cascaded communication with the position sensor system providing at least one excitation voltage to the position sensor system and receiving at least one set of sine and cosine feedback voltages from the position sensor system to identify a differential pylon angle between the first and second pylons during pylon conversion.

20 Claims, 7 Drawing Sheets

(56) References Cited

U.S. PATENT DOCUMENTS

| 10,106,255 | B2 | 10/2018 | Covington et al. | |
|---|---|---|---|---|
| 2016/0023527 | A1* | 1/2016 | Dietrich | B64D 35/024 |
| | | | | 244/2 |
| 2016/0098019 | A1* | 4/2016 | Kirshenboim | G05B 11/011 |
| | | | | 318/650 |
| 2019/0074751 | A1* | 3/2019 | Chen | H02K 11/215 |
| 2019/0225322 | A1* | 7/2019 | Atkins | B64C 13/16 |
| 2019/0257638 | A1* | 8/2019 | Roberts | G01D 5/2053 |
| 2019/0332126 | A1 | 10/2019 | Irwin, III et al. | |
| 2020/0207467 | A1 | 7/2020 | Morgan | |

* cited by examiner

PYLON TRACKING SYSTEMS FOR TILTROTOR AIRCRAFT

CROSS-REFERENCE TO RELATED APPLICATIONS

The present application is a continuation of co-pending application Ser. No. 17/541,906 filed Dec. 3, 2021 which claims the benefit of provisional application 63/138,741, filed Jan. 18, 2021, the entire contents of each are hereby incorporated by reference.

GOVERNMENT RIGHTS

This invention was made with U.S. Government support under Agreement No. W9124P-19-9-0001 awarded by the Army Contracting Command-Redstone Arsenal to the AMTC and a related AMTC Project Agreement 19-08-006 with Bell Textron Inc. The Government has certain rights in the invention.

TECHNICAL FIELD OF THE DISCLOSURE

The present disclosure relates, in general, to tiltrotor aircraft operable for vertical takeoff and landing in a helicopter mode and forward flight in an airplane mode and, in particular, to pylon tracking systems for identifying a differential pylon angle between the two pylons during conversions between helicopter mode and airplane mode.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the airplane in flight. Fixed-wing aircraft, however, typically require a runway that is hundreds or thousands of feet long for takeoff and landing. Unlike fixed-wing aircraft, vertical takeoff and landing (VTOL) aircraft do not require runways. Instead, VTOL aircraft are capable of taking off, hovering and landing vertically. One example of VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas where fixed-wing aircraft may be unable to take off and land. Helicopters, however, typically lack the forward airspeed of fixed-wing aircraft.

Tiltrotor aircraft attempt to overcome these drawbacks by utilizing proprotors that can change their plane of rotation based upon the operation being performed. Tiltrotor aircraft typically have a pair of pylons mounted near the outboard ends of a fixed wing with each pylon supporting one of the proprotor. The pylons are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane. It has been found, however, that when tiltrotor aircraft convert between helicopter mode and airplane mode, the respective angular positions of the pylons relative to the fixed wing should be matched. Accordingly, a need has arisen for a pylon tracking system for identifying a differential angle between the two pylons during conversions between helicopter mode and airplane mode.

SUMMARY

In a first aspect, the present disclosure is directed to a pylon tracking system for a tiltrotor aircraft including first and second pylons each having a pylon conversion actuator with primary and backup drive systems. The pylon tracking system includes a plurality of rotary position sensors including a first rotary position sensor coupled to the primary drive system of the first pylon, a second rotary position sensor coupled to the backup drive system of the first pylon, a third rotary position sensor coupled to the primary drive system of the second pylon and a fourth rotary position sensor coupled to the backup drive system of the second pylon. A flight control computer is in communication with the plurality of rotary position sensors and is configured to process feedback therefrom to identify a differential pylon angle between the first and second pylons during pylon conversion operations.

In some embodiments, each of the rotary position sensors may be a resolver configured to receive an excitation voltage and return sine and cosine feedback voltages. In certain embodiments, the flight control computer may be configured to provide an excitation voltage to each of the rotary position sensors and receive sine and cosine feedback voltages from each of the rotary position sensors. In some embodiments, the flight control computer may be configured to provide excitation voltages to the first and third rotary position sensors and receive sine and cosine feedback voltages from the second and fourth rotary position sensors. In such embodiments, the first rotary position sensor may be configured to provide excitation voltages to the second rotary position sensor and the third rotary position sensor may be configured to provide excitation voltages to the fourth rotary position sensor. In certain embodiments, the flight control computer may be configured to provide excitation voltages to the first and second rotary position sensors and receive sine and cosine feedback voltages from the third and fourth rotary position sensors. In such embodiments, the first rotary position sensor may be configured to provide excitation voltages to the third rotary position sensor and the second rotary position sensor may be configured to provide excitation voltages to the fourth rotary position sensor. In some embodiments, the flight control computer may be configured to provide an excitation voltage to the first rotary position sensor and receive sine and cosine feedback voltages from the fourth rotary position sensor. In such embodiments, the first rotary position sensor may be configured to provide excitation voltages to the second rotary position sensor, the second rotary position sensor may be configured to provide excitation voltages to the third rotary position sensor and the third rotary position sensor may be configured to provide excitation voltages to the fourth rotary position sensor.

In certain embodiments, the first and second rotary position sensors may be vertically cascaded and the third and fourth rotary position sensors may be vertically cascaded. In some embodiments, the first and third rotary position sensors may be horizontally cascaded and the second and fourth rotary position sensors may be horizontally cascaded. In certain embodiments, the rotary position sensors may be fully cascaded. In some embodiments, the plurality of rotary position sensors may include a fifth rotary position sensor coupled to the primary drive system of the first pylon, a sixth rotary position sensor coupled to the backup drive system of the first pylon, a seventh rotary position sensor coupled to the primary drive system of the second pylon and an eighth rotary position sensor coupled to the backup drive system of the second pylon. In such embodiments, the first, second, third and fourth rotary position sensors may form a course tracking loop and the fifth, sixth, seventh and eighth rotary position sensors may form a fine tracking loop. Also, in such embodiments, the fifth, sixth, seventh and eighth rotary position sensors may have a higher resolution than the first, second, third and fourth rotary position sensors such as a resolution that is at least ten times higher than the first, second, third and fourth rotary position sensors.

In a second aspect, the present disclosure is directed to a tiltrotor aircraft having a helicopter mode and an airplane mode. The tiltrotor aircraft includes an airframe including a fuselage and a wing. First and second pylons are coupled to the airframe above the wing. Each pylon includes a pylon conversion actuator with primary and backup drive systems. A plurality of rotary position sensors includes a first rotary position sensor coupled to the primary drive system of the first pylon, a second rotary position sensor coupled to the backup drive system of the first pylon, a third rotary position sensor coupled to the primary drive system of the second pylon and a fourth rotary position sensor coupled to the backup drive system of the second pylon. A flight control computer is in communication with the plurality of rotary position sensors and is configured to process feedback therefrom to identify a differential pylon angle between the first and second pylons during pylon conversion operations.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Figures 1A, 1B:
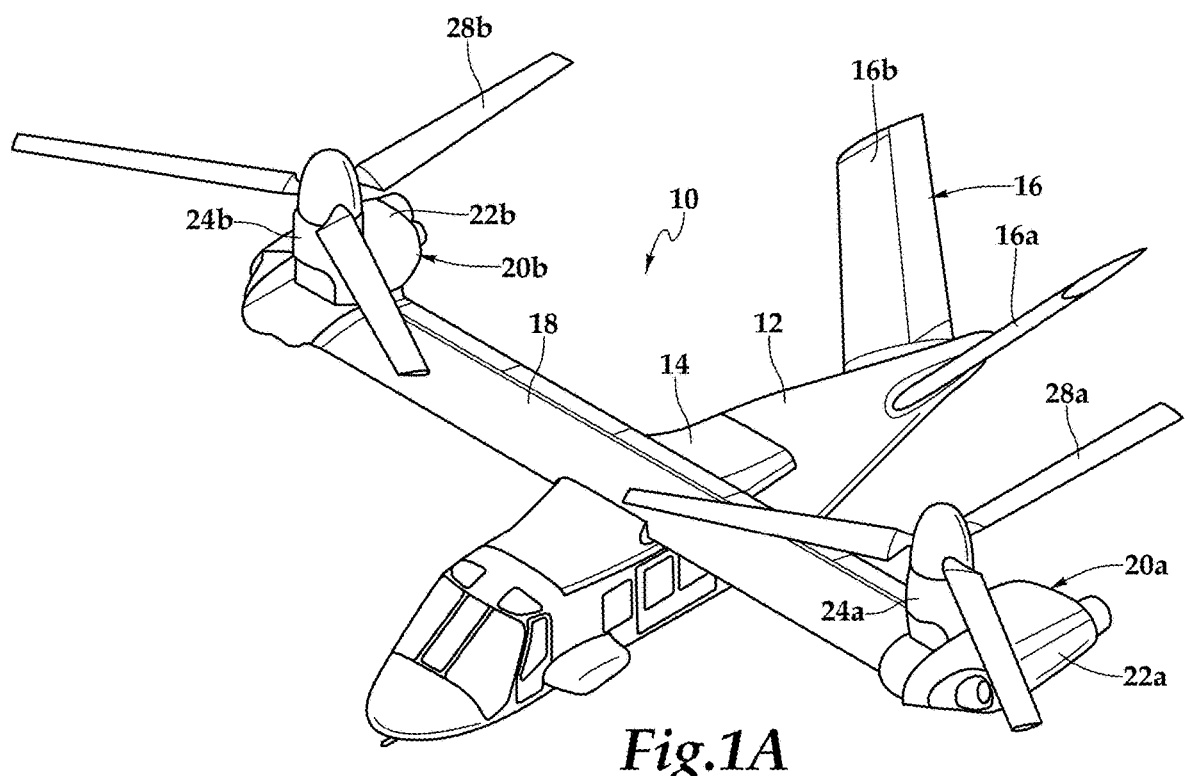
FIGS. 1A-1B are perspective views of a tiltrotor aircraft in the helicopter mode and the airplane mode respectively, in accordance with embodiments of the present disclosure.

Referring to FIGS. 1A-1B in the drawings, a tiltrotor aircraft is schematically illustrated and generally designated 10. Tiltrotor aircraft 10 includes a fuselage 12, a wing mount assembly 14 that is rotatable relative to fuselage 12 and a tail assembly 16 including rotatably mounted tail members 16a, 16b having control surfaces operable for horizontal and/or vertical stabilization during forward flight. A wing 18 is supported by wing mount assembly 14 and rotates with wing mount assembly 14 relative to fuselage 12 to enable tiltrotor aircraft 10 convert to a storage configuration. Together, fuselage 12, tail assembly 16 and wing 18 as well as their various frames, longerons, stringers, bulkheads, spars, ribs, skins and the like may be considered to be the airframe of tiltrotor aircraft 10.

Located proximate the outboard ends of wing 18 are propulsion assemblies 20a, 20b. Propulsion assembly 20a includes a fixed nacelle 22a that houses an engine and a fixed portion of the drive system. In addition, propulsion assembly 20a includes a pylon 24a that is positioned generally inboard of fixed nacelle 22a and above wing 18. Pylon 24a is rotatable relative to fixed nacelle 22a and wing 18 responsive to operation of a pylon actuator 26a that includes one or more rotary position sensors that track the angular position of pylon 24a relative to wing 18 when pylon 24a is operated between the generally vertical orientation, as best seen in FIG. 1A, and the generally horizontal orientation, as best seen in FIG. 1B. Pylon 24a includes a rotatable portion of the drive system and a proprotor assembly 28a that is rotatable responsive to torque and rotational energy provided via the engine and drive system. Likewise, propulsion assembly 20b includes a fixed nacelle 22b that houses an engine and a fixed portion of the drive system. In addition, propulsion assembly 20b includes a pylon 24b that is positioned generally inboard of fixed nacelle 22b and above wing 18. Pylon 24b is rotatable relative to fixed nacelle 22b and wing 18 responsive to operation of a pylon actuator 26b that includes one or more rotary position sensors that track the angular position of pylon 24b relative to wing 18 when pylon 24b is operated between the generally vertical orientation, as best seen in FIG. 1A, and the generally horizontal orientation, as best seen in FIG. 1B. Pylon 24b includes a rotatable portion of the drive system and a proprotor assembly 28b that is rotatable responsive to torque and rotational energy provided via the engine and drive system.

FIG. 1A illustrates tiltrotor aircraft 10 in helicopter or VTOL flight mode, in which proprotor assemblies 28a, 28b are rotating in a substantially horizontal plane to provide a lifting thrust, such that tiltrotor aircraft 10 flies much like a conventional helicopter. FIG. 1B illustrates tiltrotor aircraft 10 in airplane or forward flight mode, in which proprotor assemblies 28a, 28b are rotating in a substantially vertical plane to provide a forward thrust enabling wing 18 to provide a lifting force responsive to forward airspeed, such that tiltrotor aircraft 10 flies much like a conventional propeller driven aircraft. It should be appreciated that tiltrotor aircraft 10 can be operated such that proprotor assemblies 28a, 28b are selectively positioned between airplane mode and helicopter mode, which can be referred to as a conversion flight mode. Even though tiltrotor aircraft 10 has been described as having one engine in each fixed nacelle 22a, 22b, it should be understood by those having ordinary skill in the art that other propulsion system arrangements are possible and are considered to be within the scope of the present disclosure including, for example, having one or more engines housed within fuselage 12 that provide torque and rotational energy to both proprotor assemblies 28a, 28b.

During all flight modes, proprotor assemblies 28a, 28b rotate in opposite directions to provide torque balancing to tiltrotor aircraft 10. For example, when viewed from the front of tiltrotor aircraft 10 in forward flight mode, proprotor assembly 28a rotates clockwise and proprotor assembly 28b rotates counterclockwise. In the illustrated embodiment, proprotor assemblies 28a, 28b each include three twisted proprotor blades that are equally spaced apart circumferentially at approximately 120 degree intervals. It should be understood by those having ordinary skill in the art, however, that the proprotor assemblies of the present disclosure could have proprotor blades with other designs and other configurations including proprotor assemblies having four, five or more proprotor blades. Further, it should be understood by those having ordinary skill in the art that even though propulsion assemblies 20a, 20b are illustrated in the context of tiltrotor aircraft 10, the propulsion system of the present disclosure can be implemented on numerous types of tiltrotor aircraft including, for example, quad tiltrotor aircraft, transport tiltrotor aircraft, scout tiltrotor aircraft, multirole tiltrotor aircraft and unmanned tiltrotor aircraft to name a few.

Tiltrotor aircraft 10 has a pylon tracking system that identifies a differential pylon angle between pylons 24a, 24b during conversions between helicopter mode and airplane mode. Importantly, when tiltrotor aircraft 10 converts between helicopter mode and airplane mode, the respective angular positions of pylons 24a, 24b relative to wing 18 should be matched and/or should not deviate from one another beyond a predetermined threshold such as about two degrees or other suitable limit. In the illustrated embodiment, tiltrotor aircraft 10 is a fly-by-wire aircraft that includes a flight control computer 30 configured to implement a plurality of modules such as a pylon tracking module that communicates with the rotary position sensors operably associated with pylon actuators 26a, 26b. For example, the pylon tracking module of flight control computer 30 may send commands to the rotary position sensors in the form of one or more excitation voltages and may receive feedback from the rotary position sensors in the form of sine and cosine voltages that flight control computer 30 uses to determine the angular positions of pylons 24a, 24b relative to wing 18 and/or the differential pylon angle between pylons 24a, 24b. In this example, the rotary position sensors are resolvers each having a primary winding and a pair of secondary windings, the sine and cosine windings, that are fixed in position with a ninety degree offset from one another. Each resolver outputs an analog signal caused by current passing to the primary winding which generates a magnetic field that excites separate output voltages in the sine winding and the cosine winding when the primary winding is rotated during pylon conversion operations. For each resolver, the ratio of these two voltages is processed to calculate the angular displacement of the rotor relative to the stator of the resolver. The angular displacements of the various resolvers are then used to calculate the angular positions of pylons 24a, 24b relative to wing 18 and/or the differential pylon angle between pylons 24a, 24b.

Figure 2:
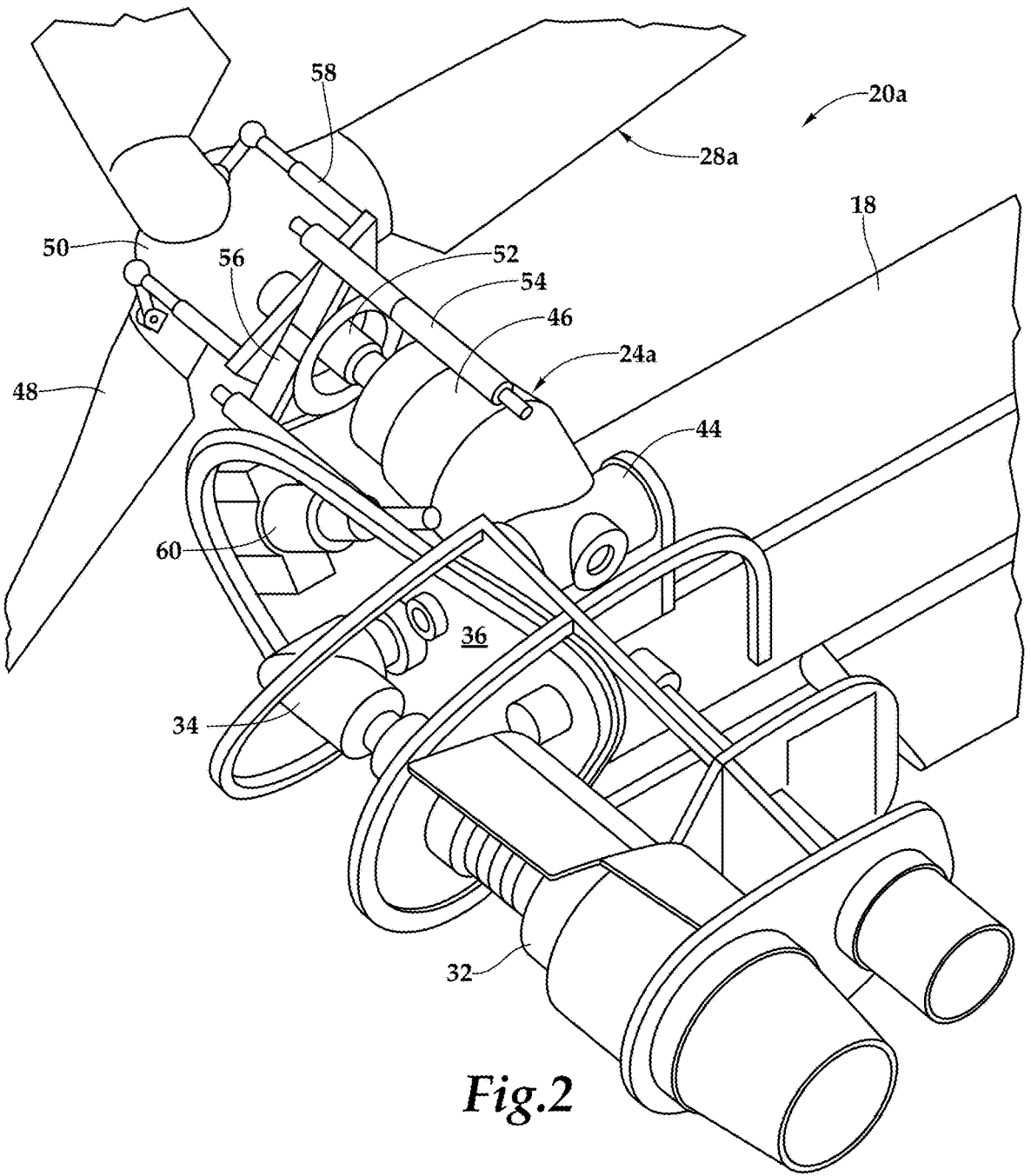
FIG. 2 is a perspective view of a propulsion system of a tiltrotor aircraft in accordance with embodiments of the present disclosure.

Referring now to FIG. 2, propulsion assembly 20a is disclosed in further detail. Propulsion assembly 20a is substantially similar to propulsion assembly 20b therefore, for sake of efficiency, certain features will be disclosed only with regard to propulsion assembly 20a. One having ordinary skill in the art, however, will fully appreciate an understanding of propulsion assembly 20b based upon the disclosure herein of propulsion assembly 20a. Propulsion assembly 20a includes an engine 32 that is fixed relative to wing 18. An engine output shaft transfers power from engine 32 to a spiral bevel gearbox 34 that includes spiral bevel gears to change torque direction by 90 degrees from engine 32 to a fixed gearbox 36. Fixed gearbox 36 includes a plurality of gears and an output shaft that transfers torque to an input gear in spindle gearbox 44 of proprotor gearbox 46. Proprotor assembly 28a of propulsion assembly 20a includes a plurality of proprotor blades 48 coupled to a yoke 50 that is coupled to a mast 52. Mast 52 is coupled to proprotor gearbox 46. The collective and/or cyclic pitch of proprotor blades 48 may be controlled via actuators 54, swashplate 56 and pitch links 58. During conversion of tiltrotor aircraft 10 between helicopter mode (see FIG. 1A) and airplane mode (see FIG. 1B), a conversion actuator 60 selectively rotates pylon 24a approximately ninety degrees between the substantially vertical orientation for the helicopter mode of tiltrotor aircraft 10 and the substantially horizontal orientation for the airplane mode of tiltrotor aircraft 10. In some embodiments, it may be desirable for the pylons to have an angular range greater then ninety degrees such as ninety-five degrees or other angular range enabling the pylons to have angular positions past vertical for certain operations.

Figure 3A:
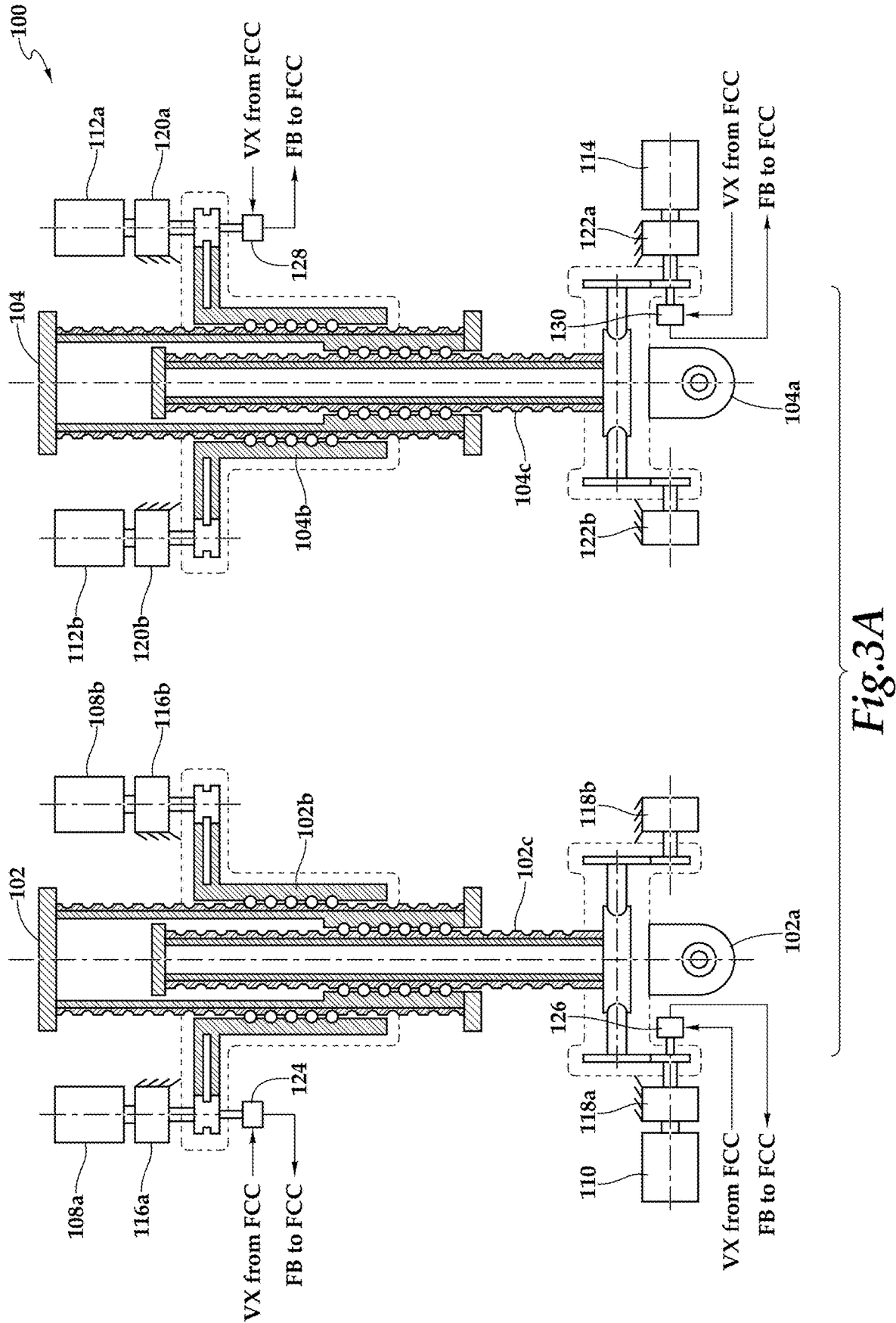
FIGS. 3A-3E are mechanic and electrical schematic illustrations of a pylon conversions system incorporating various pylon tracking systems in accordance with embodiments of the present disclosure.

Referring now to FIG. 3A of the drawings, therein is depicted a mechanical and electrical schematic illustration of a pylon conversion system of the present disclosure that is generally designated 100. Pylon conversion system 100 includes a pair of pylon conversion actuators 102, 104 that are depicted as telescoping balls screws. Pylon conversion actuators 102, 104 may be coupled to the airframe of tiltrotor aircraft 10 and have lug ends 102a, 104a each of which is coupled to one of pylons 24a, 24b to operate pylons 24a, 24b between the generally horizonal and the generally vertical orientations. In the illustrated embodiment, pylon conversion actuator 102 has a primary drive system including hydraulic motors 108a, 108b that may be operated individually or collectively to rotate a nut 102b of the ball screw which extends and retracts a screw 102c of the ball screw relative to nut 102b. Pylon conversion actuator 102 also has a backup drive system including a hydraulic motor 110 that may be operated to rotate screw 102c which also extends and retracts screw 102c relative to nut 102b. The primary drive system and the backup drive system are independent drive systems that provide mechanical redundancy to pylon conversion actuator 102. Likewise, pylon conversion actuator 104 has a primary drive system including hydraulic motors 112a, 112b that may be operated individually or collectively to rotate a nut 104b of the ball screw which extends and retracts a screw 104c of the ball screw relative to nut 104b. Pylon conversion actuator 104 also has a backup drive system including a hydraulic motor 114 that may be operated to rotate screw 104c which also extends and retracts screw 104c relative to nut 104b. The primary drive system and the backup drive system are independent drive systems that provide mechanical redundancy to pylon conversion actuator 104.

In the illustrated embodiment, a plurality of brake systems are operably associated with the primary drive systems and the backup drives systems of pylon conversion system 100. Specifically, the primary drive system of pylon conversion actuator 102 includes brake 116a that is operably associated with hydraulic motor 108a and brake 116b that is operably associated with hydraulic motor 108b. The backup drive system of pylon conversion actuator 102 includes brake 118a that is operably associated with hydraulic motor 110a and brake 118b. The primary drive system of pylon conversion actuator 104 includes brake 120a that is operably associated with hydraulic motor 112a and brake 120b that is operably associated with hydraulic motor 112b. The backup drive system of pylon conversion actuator 104 includes brake 122a that is operably associated with hydraulic motor 114 and brake 122b. Brakes 116a, 116b allow and prevent either or both of hydraulic motors 108a, 108b from imparting torque and rotational energy to nut 102b. Brakes 118a, 118b allow and prevent hydraulic motor 110 from imparting torque and rotational energy to screw 102c. Brakes 120a, 120b allow and prevent either or both of hydraulic motors 112a, 112b from imparting torque and rotational energy to nut 104b. Brakes 122a, 122b allow and prevent hydraulic motor 114 from imparting torque and rotational energy to screw 104c.

In the illustrated embodiment, pylon conversion system 100 includes the mechanical components of the pylon tracking system that are used to identify the respective angular positions of pylons 24a, 24b relative to wing 18 and/or a differential pylon angle between pylons 24a, 24b during conversions between helicopter mode and airplane mode. As discussed herein, when tiltrotor aircraft 10 converts between helicopter mode and airplane mode, the respective angular positions of pylons 24a, 24b relative to wing 18 should be matched and/or should not deviate from one another beyond a predetermined threshold such as about two degrees or other suitable limit. To monitor this condition, pylon conversion system 100 includes a plurality of rotary position sensors that are operably associated with the primary drive systems and the backup drives systems of pylon conversion system 100. Specifically, the primary drive system of pylon conversion actuator 102 includes a rotary position sensor 124 that is operably associated with the rotation of nut 102b responsive to operation of hydraulic motor 108a and/or hydraulic motor 108b. The backup drive system of pylon conversion actuator 102 includes a rotary position sensor 126 that is operably associated with the rotation of screw 102c responsive to operation of hydraulic motor 110. The primary drive system of pylon conversion actuator 104 includes a rotary position sensor 128 that is operably associated with the rotation of nut 104b responsive to operation of hydraulic motor 112a and/or hydraulic motor 112b. The backup drive system of pylon conversion actuator 104 includes a rotary position sensor 130 that is operably associated with the rotation of screw 104c responsive to operation of hydraulic motor 114.

As discussed herein, rotary position sensors 124, 126, 128, 130 may be resolvers each having a primary winding and a pair of secondary windings that are fixed in position with a ninety degree offset from one another that act as sine and cosine windings. Each resolver receives an excitation voltage as an input and generates a unique sine-cosine feedback at every point in a 360 degree rotation of the rotor relative to the stator of the resolver. The angular displacements of the various resolvers are then used to calculate the angular positions of pylons 24a, 24b relative to wing 18 and/or the differential pylon angle between pylons 24a, 24b. In the illustrated embodiment, the mechanical input into rotary position sensors 124, 126, 128, 130 is geared such that for each one-degree of pylon angular movement created by the respective drive system, the associated rotary position sensor 124, 126, 128, 130 experiences three degrees of angular displacement between its rotor and its stator. Thus, in this embodiment, rotary position sensors 124, 126, 128, 130 have a 3 to 1 angular displacement ratio with the respective pylon. In other embodiments, the rotary position sensors could have other angular displacement ratios with the pylons both greater than or less than 3 to 1.

Example conversion operations will now be discussed. In these examples, rotary position sensors 124, 126 start with an angular displacement reading of zero degrees with pylon 24a in the generally horizontal orientation and having an angle of zero degrees relative to wing 18. Likewise, rotary position sensors 128, 130 start with an angular displacement reading of zero degrees with pylon 24b in the generally horizonal orientation and having an angle of zero degrees relative to wing 18. If the primary drive systems of pylon conversion system 100 are used to convert pylons 24a, 24b from the generally horizonal orientation to the generally vertical orientation, the operation of pylon conversion actuators 102, 104 causes a 270 degree angular displacement in rotary position sensors 124, 128 and a zero degree angular displacement in rotary position sensors 126, 130. In the illustrated implementation, flight control computer 30 provides an excitation voltage to each of rotary position sensors 124, 126, 128, 130, as indicated by the VX from FCC arrows to each of rotary position sensors 124, 126, 128, 130. In addition, each of rotary position sensors 124, 126, 128, 130 returns a sine-cosine feedback to flight control computer 30, as indicated by the FB to FCC arrows from each of rotary position sensors 124, 126, 128, 130. In this case, the sine-cosine feedback from rotary position sensor 124 is 270 degrees, the sine-cosine feedback from rotary position sensor 126 is zero degrees, the sine-cosine feedback from rotary position sensor 128 is 270 degrees and the sine-cosine feedback from rotary position sensor 130 is zero degrees. Based upon the sine-cosine feedback from each of rotary position sensors 124, 126, 128, 130, flight control computer 30 is configured to calculate the absolute angular positions of pylons 24a, 24b, which in this case is ninety degrees for each of pylons 24a, 24b.

Alternatively, if the backup drive systems of pylon conversion system 100 are used to convert pylons 24a, 24b from the generally horizonal orientation to the generally vertical orientation, the operation of pylon conversion actuators 102, 104 causes a 270 degree angular displacement in rotary position sensors 126, 130 and a zero degree angular displacement in rotary position sensors 124, 128. In this case, the sine-cosine feedback from rotary position sensor 124 is zero degrees, the sine-cosine feedback from rotary position sensor 126 is 270 degrees, the sine-cosine feedback from rotary position sensor 128 is zero degrees and the sine-cosine feedback from rotary position sensor 130 is 270 degrees. Based upon the sine-cosine feedback from each of rotary position sensors 124, 126, 128, 130, flight control computer 30 is configured to calculate the absolute angular positions of pylons 24a, 24b, which in this case is ninety degrees for each of pylons 24a, 24b.

In the following case, both the primary and the backup drive systems of pylon conversion system 100 are involved in converting pylons 24a, 24b from the generally horizontal orientation to the generally vertical orientation. In this case, a fault has occurred in the primary drive system of pylon conversion actuator 102 during the conversion process such that the primary drive system is responsible for forty degrees of angular rotation of pylon 24a and the backup drive system is responsible for fifty degrees of angular rotation of pylon 24a. The primary drive system of pylon conversion actuator 104 is responsible for the entire ninety degrees of angular rotation of pylon 24b. In this case, the sine-cosine feedback from rotary position sensor 124 is 120 degrees, the sine-cosine feedback from rotary position sensor 126 is 150 degrees, the sine-cosine feedback from rotary position sensor 128 is 270 degrees and the sine-cosine feedback from rotary position sensor 130 is zero degrees. Based upon the sine-cosine feedback from each of rotary position sensors 124, 126, 128, 130, flight control computer 30 is configured to calculate the absolute angular positions of pylons 24a, 24b, which in this case is ninety degrees for each of pylons 24a, 24b. As this example illustrates, in order for the determine the absolute position of pylons 24a, 24b it is important to have feedback from each of rotary position sensors 124, 126, 128, 130 as both the primary and the backup drive systems of pylon conversion system 100 may be involved in a conversion operation.

In addition to calculating the absolute angular positions of pylons 24a, 24b, the pylon tracking system of the present disclosure is also used to identify if there is a differential pylon angle between pylons 24a, 24b during conversions between helicopter mode and airplane mode. Continuing with the previous example, prior to the fault in the primary drive system of pylon conversion actuator 102, hydraulic motors 108a, 108b were operating together to drive the actuation of pylon conversion actuator 102. After the fault in the primary drive system, however, hydraulic motor 110 of the backup drive system drives the actuation of pylon conversion actuator 102 by itself. This may result in a decrease in the angular velocity of pylon 24a. In this case, since pylon 24b is still being converted by the power of the two hydraulic motors 112a, 112b of pylon conversion actuator 104, the angular velocity of pylon 24b may exceed that of pylon 24a. At a certain point in time after the fault in the primary drive system, the sine-cosine feedback from rotary position sensor 124 may be 120 degrees, the sine-cosine feedback from rotary position sensor 126 may be 36 degrees, the sine-cosine feedback from rotary position sensor 128 may be 162 degrees and the sine-cosine feedback from rotary position sensor 130 may be zero degrees. Based upon the sine-cosine feedback from each of rotary position sensors 124, 126, 128, 130, flight control computer 30 is configured to calculate that the absolute angular position of pylon 24a is 52 degrees and the absolute angular positions of pylon 24b is 54 degrees which yields a differential pylon angle of two degrees between pylons 24a, 24b. The measurements taken by rotary position sensors 124, 126, 128, 130 and the calculation made by flight control computer 30 of the pylon tracking system are thus able to identify the differential pylon angle between pylons 24a, 24b during conversions between helicopter mode and airplane mode. In this case, the identified differential pylon angle may be approaching or exceeding a predetermined threshold which may be a trigger for a corrective course of action such as reducing the angular velocity of pylon 24b to compensate for the fault in the primary drive system of pylon conversion actuator 102.

Figure 3B:
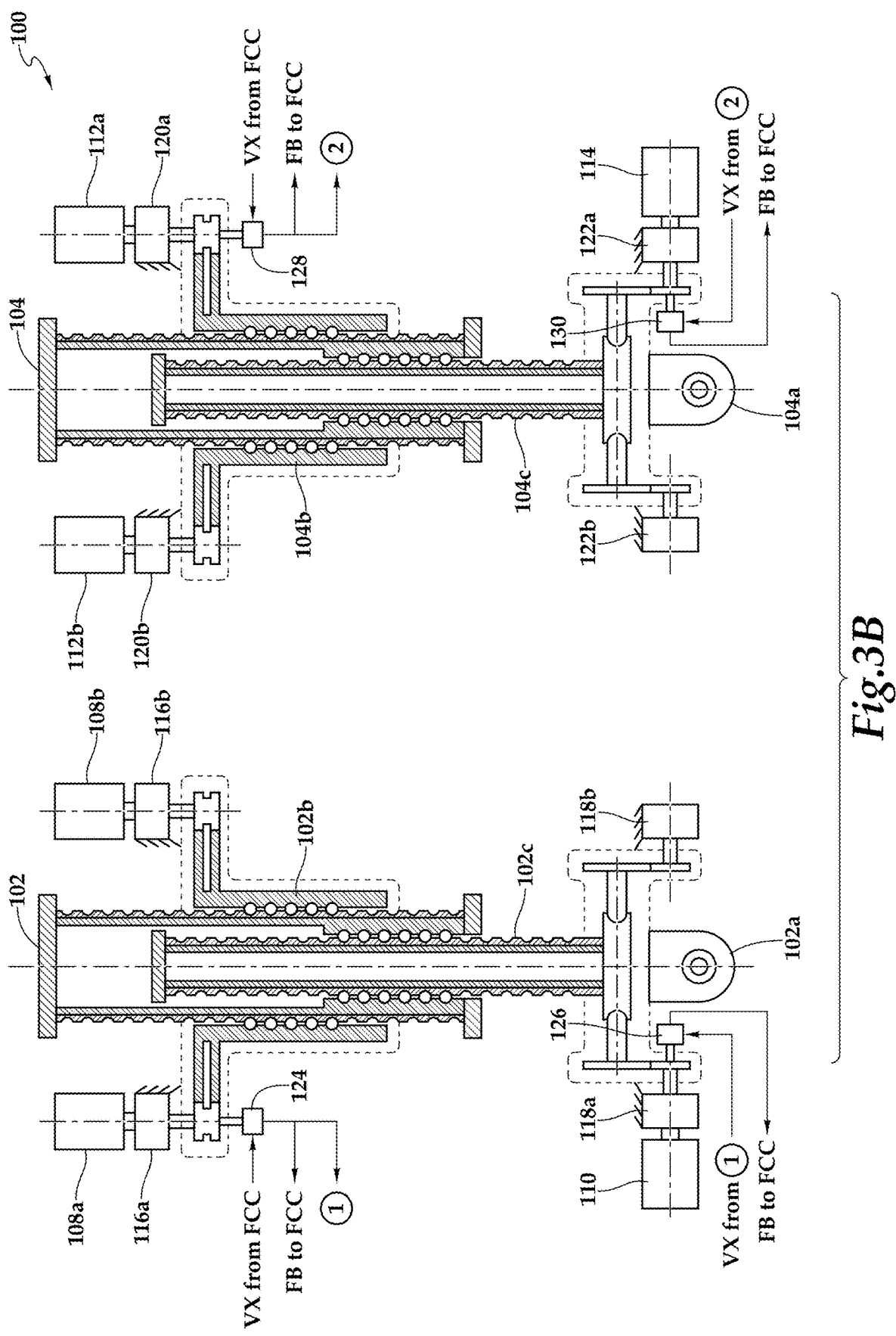

Referring next to FIG. 3B of the drawings, pylon conversion system 100 is depicted with an alternate configuration of the pylon tracking system in which the communication sequencing in the pylon tracking system has been modified to reduce the potential for tracking error within the pylon tracking system. In the illustrated embodiment, flight control computer 30 provides excitation voltages to only rotary position sensors 124, 128, as indicated by the VX from FCC arrows to rotary position sensors 124, 128, with the sine-cosine feedback from rotary position sensor 124 providing excitation voltages to rotary position sensor 126, as indicated by the VX from 1 arrow to rotary position sensor 126, and the sine-cosine feedback from rotary position sensor 128 providing excitation voltages to rotary position sensor 130, as indicated by the VX from 2 arrow to rotary position sensor 130. As illustrated, each of rotary position sensors 124, 126, 128, 130 provides sine-cosine feedback to flight control computer 30, as indicted by the FB to FCC arrows from each of rotary position sensors 124, 126, 128, 130. Flight control computer 30 is configured to calculate the angular positions of pylons 24a, 24b relative to wing 18 and/or the differential pylon angle between pylons 24a, 24b.

In this configuration, each of rotary position sensors 126, 130 has a two-phase input (the sine-cosine voltages from the respective upstream rotary position sensor) rather than the one-phase input used when the excitation voltage is provided from flight control computer 30. Also, in this configuration, certain calculations may be accomplished by rotary position sensors 126, 130 rather than by flight control computer 30 which tends to reduce the potential for tracking error within the pylon tracking system. Specifically, the output from rotary position sensor 126 may be configured to represent the net angular displacement of rotary position sensors 124, 126 and the output from rotary position sensor 130 may be configured to represent the net angular displacement of rotary position sensors 128, 130. In this manner, the illustrated pylon tracking system more directly measures the absolute angular positions of pylons 24a, 24b. Specifically, in this implementation, the absolute angular position of pylon 24a is represented by the sine-cosine feedback from rotary position sensor 126 and the absolute angular position of pylon 24b is represented by the sine-cosine feedback from rotary position sensor 130. The sine-cosine feedback from rotary position sensors 124, 128 to flight control computer 30 may be considered as optional in this implementation.

As the excitation voltages for a second component on each pylon conversion actuator are generated by a first component on each pylon conversion actuator, this configuration is referred to herein as a vertically cascaded pylon tracking system. Even though the vertically cascaded pylon tracking system of FIG. 3B has been described and depicted as having the excitation voltages for the rotary position sensors on the primary drive systems provided from the flight control computer and the excitation voltages for the rotary position sensors on the backup drive systems provided from the outputs of the rotary position sensors on the primary drive systems, it should be understood by those having ordinary skill in the art that a vertically cascaded pylon tracking system could alternatively have the excitation voltages for the rotary position sensors on the backup drive systems provided from the flight control computer and the excitation voltages for the rotary position sensors on the primary drive systems provided from the outputs of the rotary position sensors on the backup drive systems.

Example conversion operations will now be discussed. In these examples, rotary position sensors 124, 126 start with an angular displacement reading of zero degrees with pylon 24a in the generally horizontal orientation and having an angle of zero degrees relative to wing 18. Likewise, rotary position sensors 128, 130 start with an angular displacement reading of zero degrees with pylon 24b in the generally horizonal orientation and having an angle of zero degrees relative to wing 18. If the primary drive systems of pylon conversion system 100 are used to convert pylons 24a, 24b from the generally horizonal orientation to the generally vertical orientation, the operation of pylon conversion actuators 102, 104 causes a 270 degree angular displacement in rotary position sensors 124, 128 and a zero degree angular displacement in rotary position sensors 126, 130. In the illustrated implementation, flight control computer 30 provides excitation voltages to only rotary position sensors 124, 128 with the sine-cosine feedback from rotary position sensor 124 providing excitation voltages to rotary position sensor 126 and the sine-cosine feedback from rotary position sensor 128 providing excitation voltages to rotary position sensor 130.

In this case, the sine-cosine feedback provided to flight control computer 30 from each of rotary position sensors 124, 126, 128, 130 is 270 degrees. Specifically, rotary position sensors 124, 128 have rotated 270 degrees and provide sine-cosine feedback to flight control computer 30 indicating the same. In addition, the sine-cosine feedback of 270 degrees of angular displacement from rotary position sensor 124 is received and processed by rotary position sensor 126. As rotary position sensor 126 has rotated an additional zero degrees, rotary position sensor 126 provides sine-cosine feedback to flight control computer 30 indicating the net angular displacement for rotary position sensor 124 and rotary position sensor 126 of 270 degrees. Likewise, the sine-cosine feedback of 270 degrees of angular displacement from rotary position sensor 128 is received and processed by rotary position sensor 130. As rotary position sensor 130 has rotated an additional zero degrees, rotary position sensor 130 provides sine-cosine feedback to flight control computer 30 indicating the net angular displacement for rotary position sensor 128 and rotary position sensor 130 of 270 degrees. Based upon the sine-cosine feedback from each of rotary position sensors 124, 126, 128, 130 or based upon the sine-cosine feedback from only rotary position sensors 128, 130, the flight control computer 30 is configured to calculate the absolute angular positions of pylons 24a, 24b, which in this case is ninety degrees for each of pylons 24a, 24b.

In the next example, a fault has occurred in the primary drive system of pylon conversion actuator 102 during the conversion process such that the primary drive system is responsible for forty degrees of angular rotation of pylon 24a and the backup drive system is responsible for fifty degrees of angular rotation of pylon 24a. The primary drive system of pylon conversion actuator 104 is responsible for the entire ninety degrees of angular rotation of pylon 24b. In this case, the sine-cosine feedback from rotary position sensor 124 is 120 degrees, the sine-cosine feedback from rotary position sensor 126 is 270 degrees (the net angular displacement of rotary position sensors 124, 126), the sine-cosine feedback from rotary position sensor 128 is 270 degrees and the sine-cosine feedback from rotary position sensor 130 is 270 degrees (the net angular displacement of rotary position sensors 128, 130). Based upon the sine-cosine feedback from each of rotary position sensors 124,

126, 128, 130 or based upon the sine-cosine feedback from rotary position sensors 128, 130, flight control computer 30 is configured to calculate the absolute angular positions of pylons 24a, 24b, which in this case is ninety degrees for each of pylons 24a, 24b.

Figure 3C:
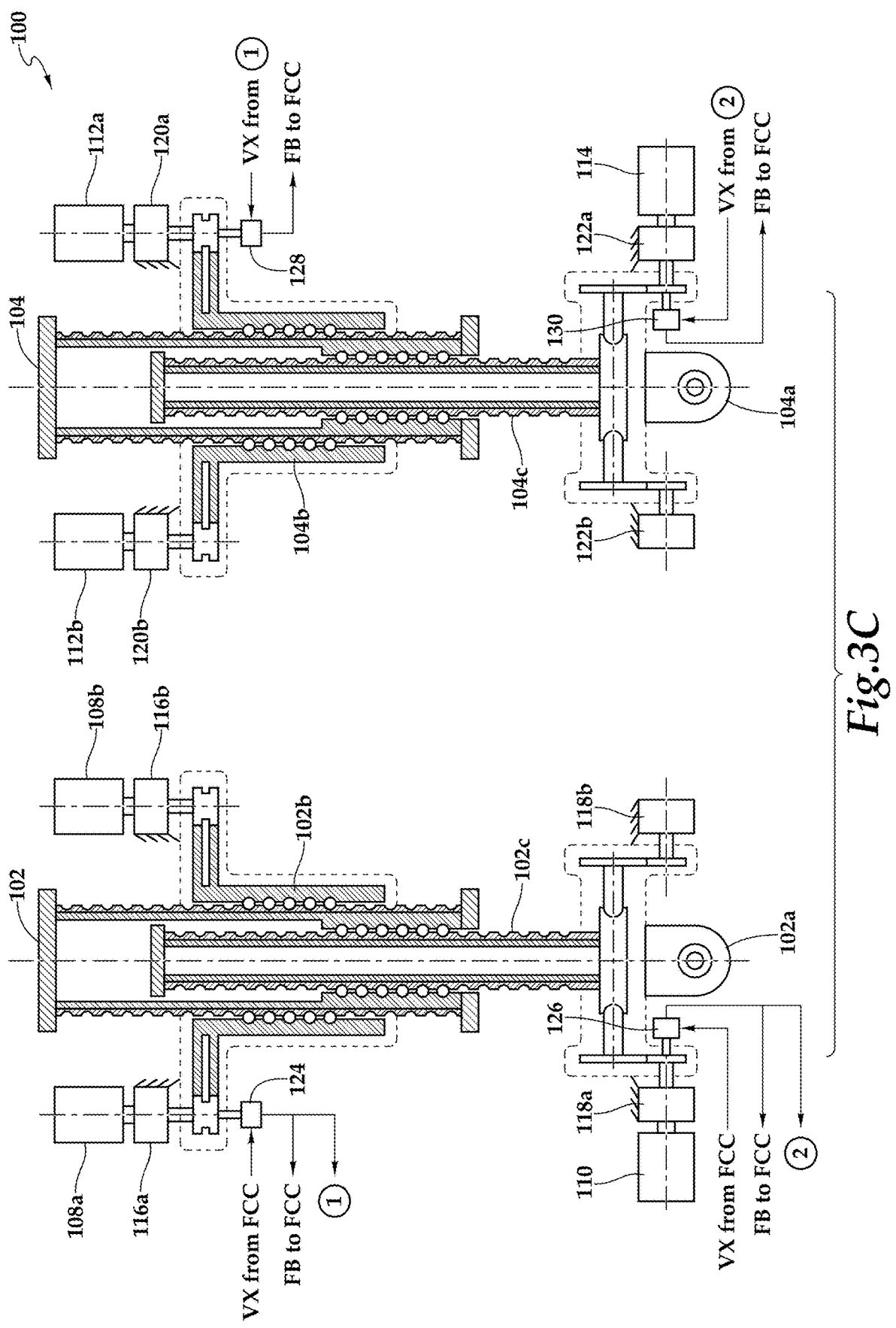

Referring next to FIG. 3C of the drawings, pylon conversion system 100 is depicted with another alternate configuration of the pylon tracking system in which the communication sequencing in the pylon tracking system has been modified to reduce the potential for tracking error within the pylon tracking system. In the illustrated embodiment, flight control computer 30 provides excitation voltages to only rotary position sensors 124, 126, as indicated by the VX from FCC arrows to rotary position sensors 124, 126, with the sine-cosine feedback from rotary position sensor 124 providing excitation voltages to rotary position sensor 128, as indicated by the VX from 1 arrow to rotary position sensor 128, and the sine-cosine feedback from rotary position sensor 126 providing excitation voltages to rotary position sensor 130, as indicated by the VX from 2 arrow to rotary position sensor 130. In the illustrated embodiment, each of rotary position sensors 124, 126, 128, 130 provides sine-cosine feedback to flight control computer 30, as indicted by the FB to FCC arrows from each of rotary position sensors 124, 126, 128, 130. Flight control computer 30 is configured to calculate the angular positions of pylons 24a, 24b relative to wing 18 and/or the differential pylon angle between pylons 24a, 24b.

In this configuration, each of rotary position sensors 128, 130 has a two-phase input (the sine-cosine voltages from the respective upstream rotary position sensor) rather than the one-phase input used when the excitation voltage is provided from flight control computer 30. Also, in this configuration, certain calculations may be accomplished by rotary position sensors 128, 130 rather than by flight control computer 30 which tends to reduce the potential for tracking error within the pylon tracking system. Specifically, the output from rotary position sensor 128 may be configured to represent the differential angular displacement of rotary position sensors 124, 128 and the output from rotary position sensor 130 may be configured to represent the differential angular displacement of rotary position sensors 126, 130. In this manner, the illustrated pylon tracking system more directly measures any differential pylon angle between pylons 24a, 24b. Specifically, in this implementation, the differential pylon angle between pylons 24a, 24b caused by operation of the primary drive systems is represented by the sine-cosine feedback from rotary position sensor 128 and the differential pylon angle between pylons 24a, 24b caused by operation of the backup drive systems is represented by the sine-cosine feedback from rotary position sensor 130. The sine-cosine feedback from rotary position sensors 124, 126 to flight control computer 30 may be considered as optional in this implementation.

As the excitation voltages for the components on one pylon conversion actuator are generated by the components on the other pylon conversion actuator, this configuration is referred to herein as a horizontally cascaded pylon tracking system. Even though the horizontally cascaded pylon tracking system of FIG. 3C has been described and depicted as having the excitation voltages for the rotary position sensors on a first pylon conversion actuator provided from the flight control computer and the excitation voltages for the rotary position sensors on the second pylon conversion actuator provided from the outputs of the rotary position sensors on the first pylon conversion actuator, it should be understood by those having ordinary skill in the art that a horizontally cascaded pylon tracking system could alternatively have the excitation voltages for one of the rotary position sensors on each of the pylon conversion actuators provided from the flight control computer and the excitation voltages for the other of the rotary position sensors on each of the pylon conversion actuators provided from the outputs of the rotary position sensors on the opposite pylon conversion actuator.

Figure 3D:
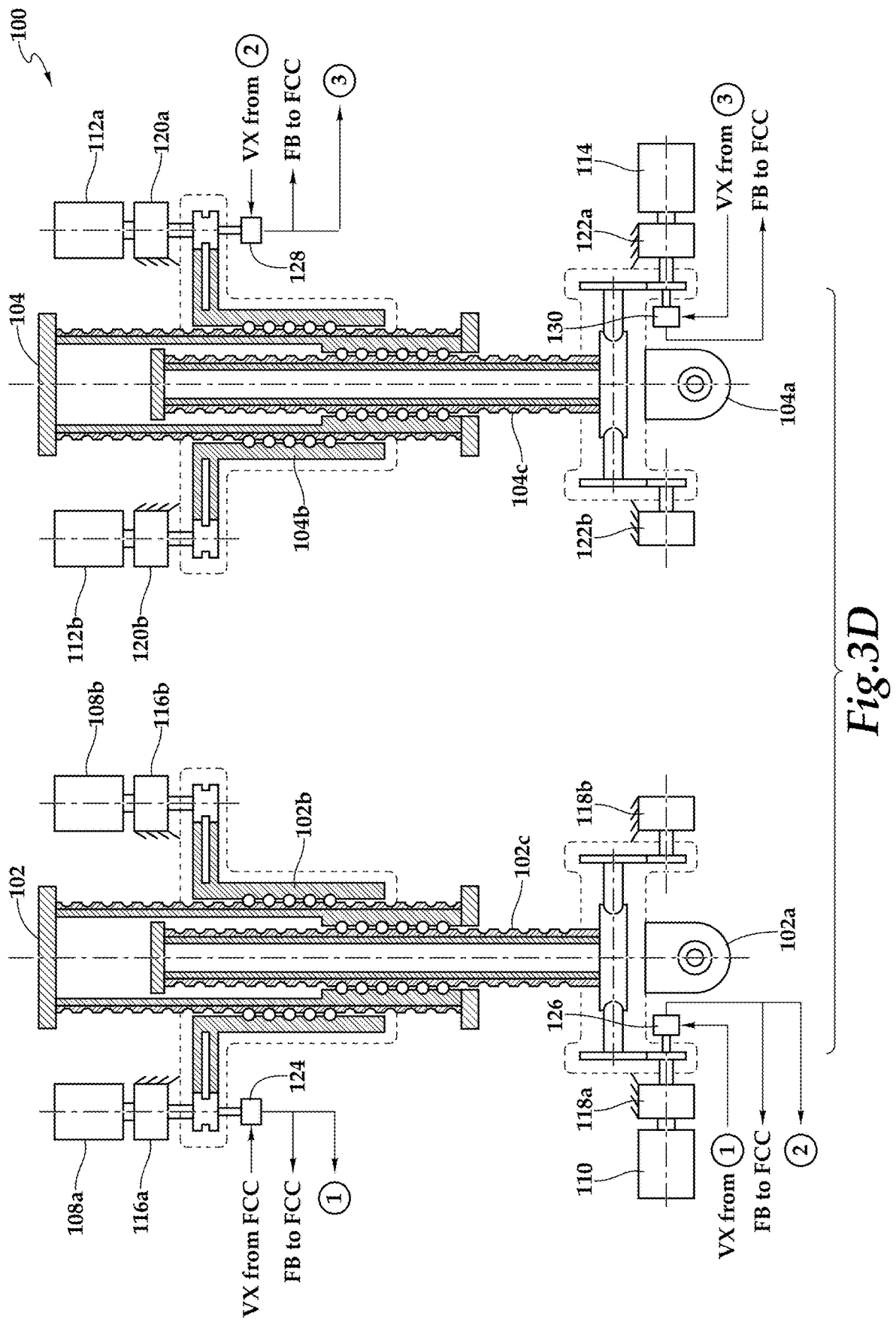

Referring next to FIG. 3D of the drawings, pylon conversion system 100 is depicted with a further alternate configuration of the pylon tracking system in which the communication sequencing in the pylon tracking system has been modified to reduce the potential for tracking error within the pylon tracking system. In the illustrated embodiment, flight control computer 30 provides an excitation voltage to only rotary position sensor 124, as indicated by the VX from FCC arrow to rotary position sensor 124, with the sine-cosine feedback from rotary position sensor 124 providing excitation voltages to rotary position sensor 126, as indicated by the VX from 1 arrow to rotary position sensor 126, the sine-cosine feedback from rotary position sensor 126 providing excitation voltages to rotary position sensor 128, as indicated by the VX from 2 arrow to rotary position sensor 128, and the sine-cosine feedback from rotary position sensor 128 providing excitation voltages to rotary position sensor 130, as indicated by the VX from 3 arrow to rotary position sensor 130. As illustrated, each of rotary position sensors 124, 126, 128, 130 provides sine-cosine feedback to flight control computer 30, as indicted by the FB to FCC arrows from each of rotary position sensors 124, 126, 128, 130. Flight control computer 30 is configured to calculate the angular positions of pylons 24a, 24b relative to wing 18 and/or the differential pylon angle between pylons 24a, 24b.

In this configuration, each of rotary position sensors 126, 128, 130 has a two-phase input (the sine-cosine voltages from the respective upstream rotary position sensor) rather than the one-phase input used when the excitation voltage is provided from flight control computer 30. Also, in this configuration, certain calculations may be accomplished by rotary position sensors 126, 128, 130 rather than by flight control computer 30 which tends to reduce the potential for tracking error within the pylon tracking system. Specifically, the output from rotary position sensor 130 may be configured to represent the differential angular displacement of rotary position sensors 124, 126 relative to rotary position sensors 128, 130 taking into account the net angular displacement of rotary position sensors 124, 126 and the net angular displacement of rotary position sensors 128, 130. In this manner, the illustrated pylon tracking system more directly measures any differential pylon angle between pylons 24a, 24b. Specifically, in this implementation, the absolute angular position of pylon 24a is represented by the sine-cosine feedback from rotary position sensor 126 and the differential pylon angle between pylons 24a, 24b is represented by the sine-cosine feedback from rotary position sensor 130. The sine-cosine feedback from rotary position sensors 124, 128 to flight control computer 30 may be considered as optional in this implementation.

As only a single excitation voltage is provided from the flight control computer, this configuration is referred to herein as a fully cascaded pylon tracking system. Even though the fully cascaded pylon tracking system of FIG. 3D has been described and depicted as having the excitation voltage for a particular rotary position sensor provided from the flight control computer and the excitation voltages for the other rotary position sensors progressing in a particular sequence, it should be understood by those having ordinary skill in the art that a fully cascaded pylon tracking system could alternatively have the excitation voltage from the flight control computer received by any one of the rotary position sensors with the excitation voltages for the other rotary position sensors progressing in any sequence.

Figure 3E:
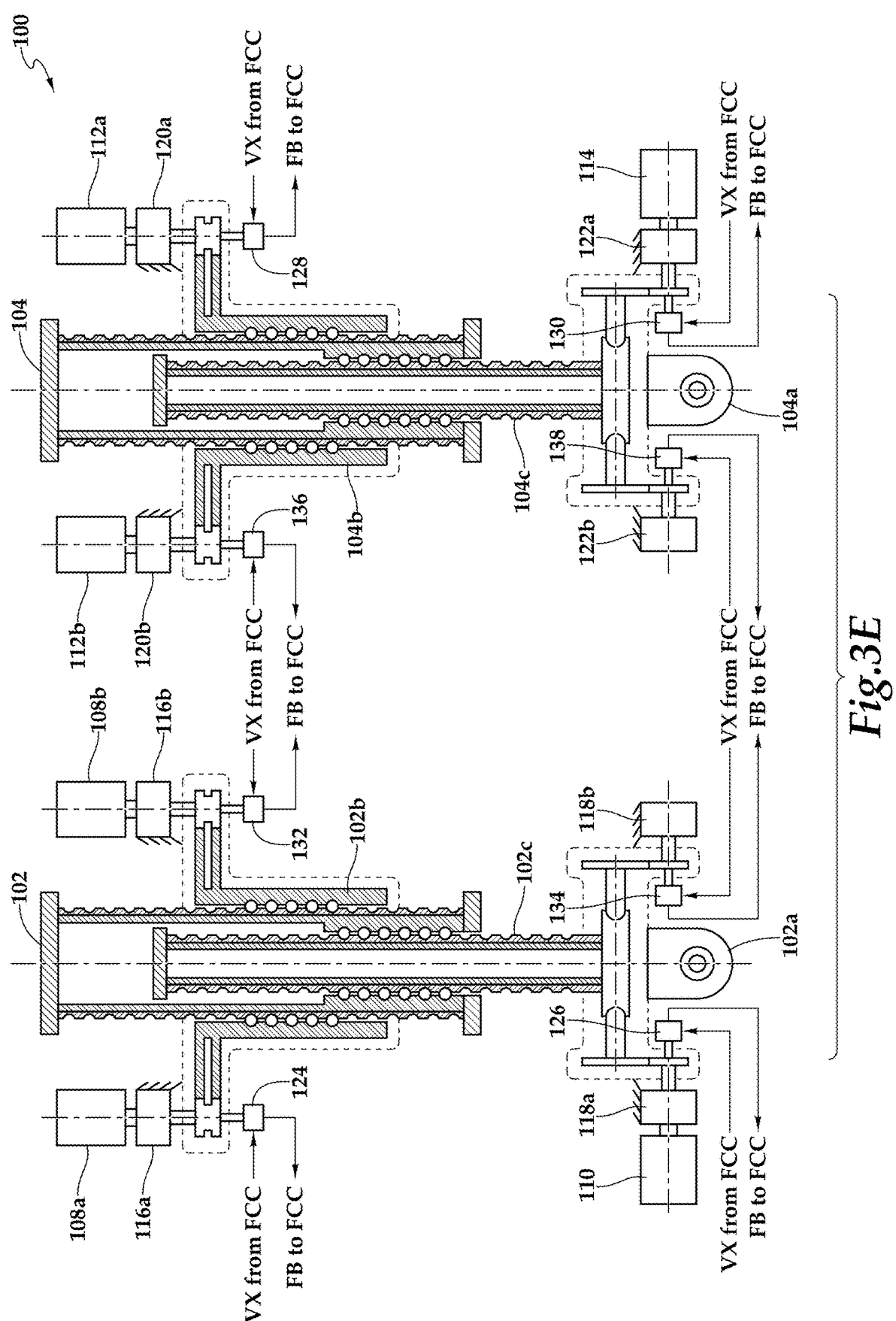

Referring next to FIG. 3E of the drawings, pylon conversion system 100 is depicted with a precision version of a pylon tracking system. The operation of rotary position sensors 124, 126, 128, 130 is the same as that described and depicted with reference to FIG. 3A. In addition, the primary drive system of pylon conversion actuator 102 includes rotary position sensor 132, the backup drive system of pylon conversion actuator 102 includes rotary position sensor 134, the primary drive system of pylon conversion actuator 104 includes rotary position sensor 136 and the backup drive system of pylon conversion actuator 104 includes rotary position sensor 138. In the illustrated embodiment, flight control computer 30 provides an excitation voltage to each of rotary position sensors 132, 134, 136, 138, as indicated by the VX from FCC arrows, with the sine-cosine feedback from each of rotary position sensors 132, 134, 136, 138 provide to flight control computer 30, as indicated by the FB to FCC arrows.

In the illustrated embodiment, the mechanical input into rotary position sensors 132, 134, 136, 138 is geared such that for each one-degree of pylon angular movement created by the respective drive system, the associated rotary position sensor 132, 134, 136, 138 experiences thirty degrees of angular displacement between its rotor and its stator. Thus, in this embodiment, rotary position sensors 132, 134, 136, 138 have a 30 to 1 angular displacement ratio with the respective pylon which corresponds to a 10 to 1 angular displacement ratio with rotary position sensors 124, 126, 128, 130. In other embodiments, rotary position sensors 132, 134, 136, 138 could have other angular displacement ratios with the pylons both greater than or less than 30 to 1. Likewise, in other embodiments, rotary position sensors 132, 134, 136, 138 could have other angular displacement ratios with rotary position sensors 124, 126, 128, 130 both greater than or less than 10 to 1. Due to the angular displacement ratios between rotary position sensors 132, 134, 136, 138 and rotary position sensors 124, 126, 128, 130, collectively, rotary position sensors 132, 134, 136, 138 are referred to herein as a fine pylon tracking loop and collectively, rotary position sensors 124, 126, 128, 130 are referred to herein as a course pylon tracking loop.

In this configuration, rotary position sensors 124, 126, 128, 130 operate as described herein providing sine-cosine feedback to flight control computer 30 during pylon conversion operations. By adding rotary position sensors 132, 134, 136, 138 to the pylon tracking system, the tracking error can be reduced and preferably driven to zero during pylon conversion operations, thereby improving the precision of the tracking data regarding the absolute angular positions of pylons 24a, 24b relative to wing 18 and/or the differential pylon angle between pylons 24a, 24b. Even though the rotary position sensors of the fine pylon tracking loop and the rotary position sensors of the course pylon tracking loop of FIG. 3E have been described and depicted as not being cascaded, it should be understood by those having ordinary skill in the art that the rotary position sensors of the fine pylon tracking loop and/or the rotary position sensors of the course pylon tracking loop could be vertically cascaded, horizontally cascaded or fully cascaded.

Also, even though two corresponding individual rotary position sensors, one for the fine pylon tracking loop and one for the course pylon tracking loop, have been described and depicted in FIG. 3E as being operably associated with each of the primary and the backup drives systems of pylon conversion actuators 102, 104, it should be understood by those having ordinary skill in the art that a single multi-turn rotary position sensor could alternatively be used to replace the corresponding individual rotary position sensors. For example, rotary position sensors 124, 132 could be replaced with a single multi-turn rotary position sensor having a single input but dual sine-cosine outputs, wherein the first sine-cosine output may have a 3 to 1 angular displacement ratio with the respective pylon and the second sine-cosine output may have a 30 to 1 angular displacement ratio with the respective pylon, thereby providing the desired pylon tracking precision. Accordingly, each pair of corresponding individual rotary position sensors such as rotary position sensors 124, 132 in FIG. 3E may collectively represent a single multi-turn rotary position sensor.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A pylon tracking system for a tiltrotor aircraft including first and second pylons each having a mechanically redundant pylon conversion actuator with a first drive system and a second drive system, the pylon tracking system comprising:

a position sensor system including a first rotary position sensor coupled to the first drive system of the first pylon, a second rotary position sensor coupled to the second drive system of the first pylon, a third rotary position sensor coupled to the first drive system of the second pylon and a fourth rotary position sensor coupled to the second drive system of the second pylon; and a flight control computer configured for cascaded communication with the position sensor system;

wherein, the flight control computer provides at least one excitation voltage to the position sensor system and receives at least one set of sine and cosine feedback voltages from the position sensor system to identify a differential pylon angle between the first and second pylons during pylon conversion operations; and wherein, the excitation and sine and cosine feedback voltages are communicated in a closed loop between the flight control computer and the position sensor system that includes routing through multiple rotary position sensors.

2. The pylon tracking system as recited in claim 1 wherein the first drive system of each pylon is a primary drive system and the second drive system of each pylon is a backup drive system.

3. The pylon tracking system as recited in claim 1 wherein each of the rotary position sensors is a resolver.

4. The pylon tracking system as recited in claim 1 wherein the flight control computer is configured for vertically cascaded communication with the position sensor system; and wherein, the flight control computer provides excitation voltages to the first and third rotary position sensors and receives sine and cosine feedback voltages from the second and fourth rotary position sensors to identify the differential pylon angle between the first and second pylons during pylon conversion operations.

5. The pylon tracking system as recited in claim 4 wherein the first rotary position sensor is configured to provide sine and cosine excitation voltages to the second rotary position sensor; and wherein, the third rotary position sensor is configured to provide sine and cosine excitation voltages to the fourth rotary position sensor.

6. The pylon tracking system as recited in claim 4 wherein the first and third rotary position sensors have one-phase inputs; and wherein, the second and fourth rotary position sensors have two-phase inputs.

7. The pylon tracking system as recited in claim 4 wherein the sine and cosine feedback voltages from the second rotary position sensor represent an absolute angular position of the first pylon; and wherein, the sine and cosine feedback voltages from the fourth rotary position sensor represent an absolute angular position of the second pylon.

8. The pylon tracking system as recited in claim 1 wherein the flight control computer is configured for horizontally cascaded communication with the position sensor system; and wherein, the flight control computer provides excitation voltages to the first and second rotary position sensors and receives sine and cosine feedback voltages from the third and fourth rotary position sensors to identify the differential pylon angle between the first and second pylons during pylon conversion operations.

9. The pylon tracking system as recited in claim 8 wherein the first rotary position sensor is configured to provide sine and cosine excitation voltages to the third rotary position sensor; and wherein, the second rotary position sensor is configured to provide sine and cosine excitation voltages to the fourth rotary position sensor.

10. The pylon tracking system as recited in claim 8 wherein the first and second rotary position sensors have one-phase inputs; and wherein, the third and fourth rotary position sensors have two-phase inputs.

11. The pylon tracking system as recited in claim 8 wherein the sine and cosine feedback voltages from the third rotary position sensor represent a differential angular displacement of the first and third rotary position sensors; and wherein, the sine and cosine feedback voltages from the fourth rotary position sensor represent a differential angular displacement of the second and fourth rotary position sensors.

12. The pylon tracking system as recited in claim 1 wherein the flight control computer is configured for fully cascaded communication with the position sensor system; and wherein, the flight control computer provides the at least one excitation voltage to the first rotary position sensor and receives sine and cosine feedback voltages from the fourth rotary position sensors to identify the differential pylon angle between the first and second pylons during pylon conversion operations.

13. The pylon tracking system as recited in claim 12 wherein the first rotary position sensor is configured to provide sine and cosine excitation voltages to the second rotary position sensor;

wherein, the second rotary position sensor is configured to provide sine and cosine excitation voltages to the third rotary position sensor; and wherein, the third rotary position sensor is configured to provide sine and cosine excitation voltages to the fourth rotary position sensor.

14. The pylon tracking system as recited in claim 12 wherein the first rotary position sensor has a one-phase input; and wherein, the second, third and fourth rotary position sensors have two-phase inputs.

15. The pylon tracking system as recited in claim 12 wherein the sine and cosine feedback voltages from the fourth rotary position sensor represent the differential pylon angle between the first and second pylons.

16. The pylon tracking system as recited in claim 1 wherein the position sensor system further comprises a fifth rotary position sensor coupled to the first drive system of the first pylon, a sixth rotary position sensor coupled to the second drive system of the first pylon, a seventh rotary position sensor coupled to the first drive system of the second pylon and an eighth rotary position sensor coupled to the second drive system of the second pylon.

17. The pylon tracking system as recited in claim 16 wherein the first, second, third and fourth rotary position sensors form a course tracking loop; and wherein, the fifth, sixth, seventh and eighth rotary position sensors form a fine tracking loop.

18. The pylon tracking system as recited in claim 16 wherein the fifth, sixth, seventh and eighth rotary position sensors have a higher resolution than the first, second, third and fourth rotary position sensors.

19. The pylon tracking system as recited in claim 16 wherein the fifth, sixth, seventh and eighth rotary position sensors have a resolution that is at least ten times higher than the first, second, third and fourth rotary position sensors.

20. A tiltrotor aircraft having a helicopter mode and an airplane mode, the tiltrotor aircraft comprising:

an airframe including a fuselage and a wing;

first and second pylons coupled to the wing, each pylon having a mechanically redundant pylon conversion actuator with a first drive system and a second drive system;

a position sensor system including a first rotary position sensor coupled to the first drive system of the first pylon, a second rotary position sensor coupled to the second drive system of the first pylon, a third rotary position sensor coupled to the first drive system of the second pylon and a fourth rotary position sensor coupled to the second drive system of the second pylon; and a flight control computer configured for cascaded communication with the position sensor system;

wherein, the flight control computer provides at least one excitation voltage to the position sensor system and receives at least one set sine and cosine feedback voltages from the position sensor system to identify a differential pylon angle between the first and second pylons during pylon conversion operations; and wherein, the excitation and sine and cosine feedback voltages are communicated in a closed loop between the flight control computer and the position sensor system that includes routing through multiple rotary position sensors.

* * * * *